United States Patent [19]

Clark et al.

[11] Patent Number: 4,729,646

[45] Date of Patent: Mar. 8, 1988

[54] MULTI-USE MICROSCOPE HAVING MODULAR CONSTRUCTION OF EXTRUDED PARTS

[75] Inventors: James A. Clark, Honeoye Falls; Michael H. Dobner, Webster; Paul A. Hoogesteger, Penfield, all of N.Y.

[73] Assignee: Bausch & Lomb Incorporated, Rochester, N.Y.

[21] Appl. No.: 863,635

[22] Filed: May 15, 1986

[51] Int. Cl.⁴ .................. G02B 21/24; A47H 1/10
[52] U.S. Cl. .................. 350/521; 248/330.1; 350/320
[58] Field of Search .............. 350/507, 521, 320; 248/330.1

[56] References Cited

U.S. PATENT DOCUMENTS 2,148,576  2/1939  Ott ........................ 350/521
4,509,834  4/1985  Hodgson ................. 350/521

FOREIGN PATENT DOCUMENTS

429668  6/1926  Fed. Rep. of Germany ...... 350/521
1208591  1/1966  Fed. Rep. of Germany ...... 350/521
1322857  2/1963  France ........................ 350/521
19161  7/1915  United Kingdom ........... 350/521

Primary Examiner—John K. Corbin
Assistant Examiner—Vincent J. Lemmo
Attorney, Agent, or Firm—John S. Norton

[57] ABSTRACT

A microscope is provided which is simply, accurately and inexpensively constructed from substantially all extruded parts. The modular construction of the microscope greatly reduces the costs of the instrument without sacrificing accuracy. The modularity further provides for a microscope which is readily adaptable to serve several distinct and separate functions.

29 Claims, 9 Drawing Figures

MULTI-USE MICROSCOPE HAVING MODULAR CONSTRUCTION OF EXTRUDED PARTS

BACKGROUND OF THE INVENTION

The field of the present invention is generally that of support and adjusting structures for precision optical instruments and, more particularly, supports and adjusting structures for microscopes manufactured from low cost yet highly accurate extruded parts.

In the past, the exceedingly accurate tolerances demanded of optical instruments, such as microscopes, required precision machined parts which are quite expensive to manufacture and, thus, add substantially to the final cost of the instrument. In an attempt to control the cost, many individual parts of the microscope, such as the base, column and arm, were produced from for example, sand or die castings. The castings were then machined to final and quite precise working dimensions. Some of the machining procedures required were: drilling and tapping holes for mounting various parts; machining surface, such as bearing ways, to assure correct optical motion and machining of at least some exterior surfaces for esthetic purposes. Each additional machining increases the final cost of the product.

As an indication of the steps necessary to finish a typical microscope column, the following rather extensive machining procedures will be described. After the column casting has been received from the foundry it is necessary to drill and tap all mounting holes. As there are generally numerous holes to be drilled and tapped, the column casting must be continually mounted, removed and re-mounted in appropriate drilling fixtures. Further, all portions of the casting which require surfacing procedures must be similarly mounted, removed and re-mounted on the required piece of machinery.

It is readily apparent that the numerous and precise machining procedures required to produce one component part, such as the above-described microscope column, add significantly to the cost and complexity of the final product. Further, each additional procedure required in the manufacture of an instrument increases the likelihood of error being manufactured into the instrument. When precision optical instruments are involved, any such errors, no matter how slight, are unacceptable.

A further problem faced by the manufacturer and the ultimate user of precision optical instruments, such as microscopes, is the need to have readily available a wide and varied range of instruments to serve the immediate needs at hand. For example, in many instances a microscope of low power of magnification is sufficient to accomplish the examining task whereas in other instances a microscope having a fairly high power of magnification is required. Still other instances require a microscope having stereoscopic capability. Other variations may require that external or internal lighting be provided. Still other variations may call for substantial differences in the size and shape of the microscope base and column. Large objects may require a relatively long column and large base. Conversely, small objects may only require a short column and small base. Still other examination procedures may require a microscope providing a substantial amount of focus travel whereas others may require only very slight focus excursions.

At least some of the heretofore mentioned problems were addressed by R. W. Hodgson in U.S. Pat. No. 4,509,834 issued Apr. 9, 1984. Mr. Hodgson recognized and described the need for a microscope stand which offered the capability of initially attaching to the stand through an auxiliary supporting structure a desired set of microscope optics which could be, at a later time, optically aligned by a relatively unskilled worker. Although this apparatus does allow for the reduction of labor necessary to complete one step of the assembly procedure and the possibility of interchangeability of parts, it does not address or contemplate the problem of complexity of manufacturing and assembly. Accordingly, there would be a substantial increase in the final cost of the microscope.

U.S. Pat. No. 3,307,896 issued Mar. 7, 1967 to P.A. Hoogesteger sets forth a low power microscope which, for purposes of cost savings and mass production, is molded from plastic. While this microscope was inexpensive to manufacture it was only satisfactory for low power applications and offered no capability for precision adjustments nor any potential for adapting other optics or accessories.

A further low cost microscope which lends itself to mass production is disclosed in U.S. Pat. No. 3,328,109 issued June 27, 1967 to F. A. Seedhouse. In particular, Seedhouse discloses a stereomicroscope which, for purposes of economy and ease of construction, is manufactured from a minimum number of parts, at least some of which are plastic. However, there is no provision for interchangeability of parts such as, for instance, removing the stereo systems and replacing it with a mono system. Additionally, no accessories or options may be added to this microscope.

In U.S. Ser. No. 650,927 filed Sept. 14, 1984, M. Dobner, a co-inventor hereof, a mechanism is disclosed which removes play from the linear motion of a microscope slide assembly mounted to a vertical column. Although not specifically referred to as such in the specification of this application, the column was an extrusion.

Therefore, it will be readily appreciated that in the past a significant number of separate and distinct microscopes were required to be produced by a manufacturer, stocked by a dealer and possessed by an end user to satisfy the many and varied tasks being undertaken.

Accordingly, a very distinct yet unfulfilled need has existed for a microscope which is of high quality, yet is inexpensive to manufacture. A microscope of this type would further provide for simple interchangeabilty of parts allowing for many types of microscopes to be readily and easily constructed from stock parts. Furthermore, an unsatisfied need exists for a high quality, precision microscope which is manufactured from inexpensive extruded parts.

BRIEF SUMMARY OF THE INVENTION

The present invention, in a most utilitarian, economical and precise manner provides a solution to the problems encountered in microscopes of the past as described hereinabove. The present invention provides a modular system for constructing microscopes from extruded parts which reduces costs to the manufacturer as well as the end user. The modular system permitted by utilization of extruded parts, allows a great number of microscopes to be inexpensively constructed with a very minimum number of parts which are readily available from the shelf or from the manufacturer. A microscope constructed according to the present invention incorporates easy to accomplish adjustments for such important components as the focus adjusting mechanism and slide mechanism. Further, the present invention incorporates therein numerous features which allow additional accessories to be adapted thereto without modification to the basic microscope itself.

Further advantages and features of the present invention, as defined by the appended claims, will become readily apparent upon consideration of the following description and accompanying drawings.

DETAILED DESCRIPTION OF THE PREFERRED EMBODIMENT

Figure 1:
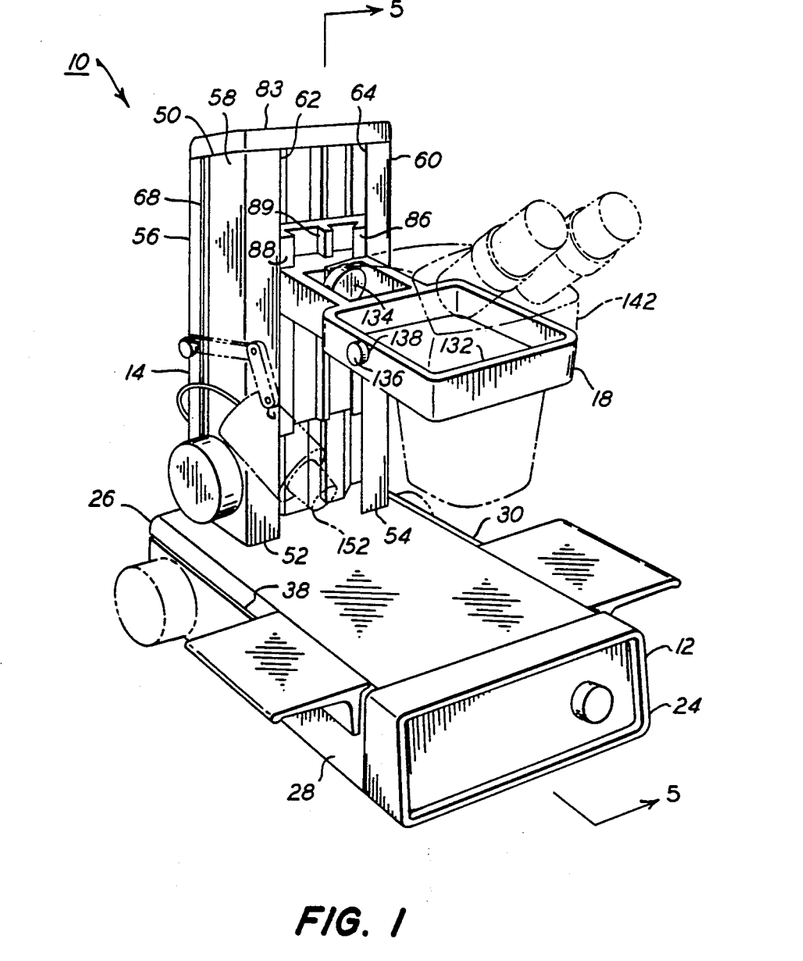
FIG. 1 is a perspective view of a modular microscope constructed of extruded parts.
Figure 7:
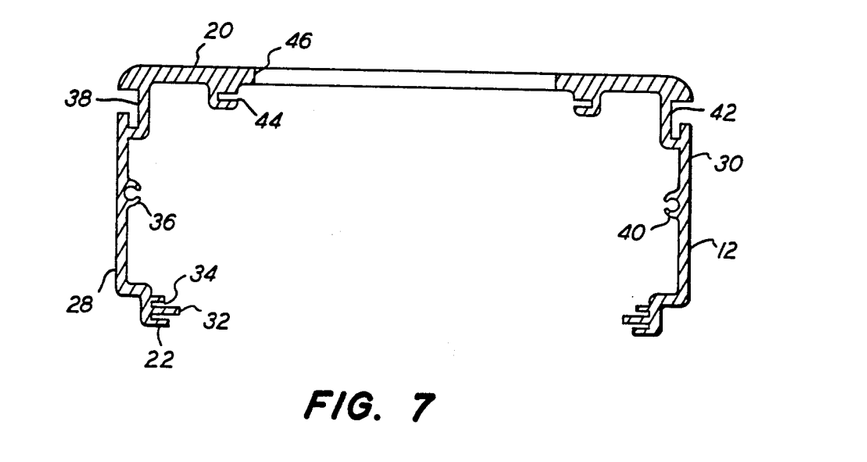
FIG. 7 is a sectional view taken along line 7—7 of FIG. 1.

A microscope 10 is shown in FIG. 1 which includes a base 12, a column 14 affixed to the base, a slide 16 mounted for low-friction linear motion to the column and support bracket 18, also mounted for linear motion to slide 18. All of these parts are inexpensively yet precisely manufactured from extrusions. The base, as best seen in FIG. 7, is hollow and includes a top 20, bottom 22, front 24, rear 26 and sides 28 and 30. The bottom 22 includes a cover slot 32 and an accessory mounting slot 34. Side 28 includes a screw boss 36 and an interlocking slot 38. Similarly, side 30 has a screw boss 40 and interlocking slot 42. Top 20 includes a stage glass support slot 44. All of the above-referenced slots and screw bosses are automatically formed as the base 12 is extruded. Top 20 also includes a plurality of screw holes, not shown, which are machined by any conventional manner to permit attachment of the base 12 to the column 14.

Figure 2:
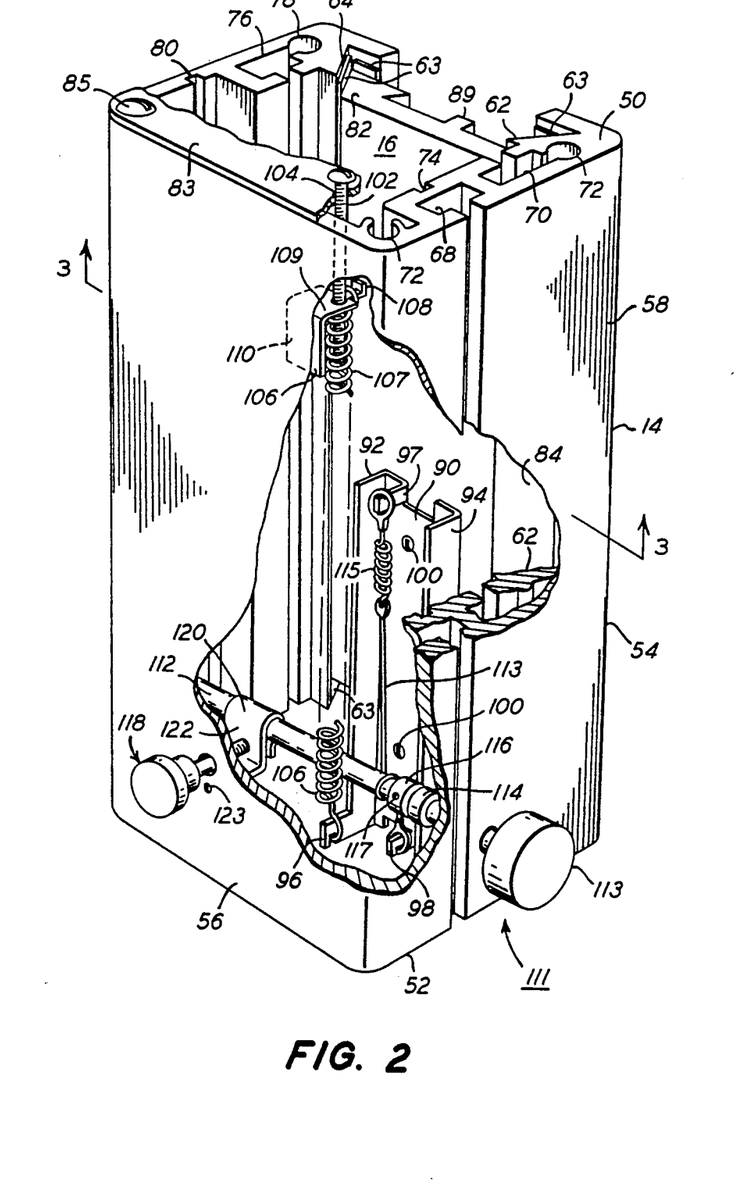
FIG. 2 is a partially broken away perspective rear view of the extruded support column of the above microscope showing the focusing mechanism in the column.
Figure 3:
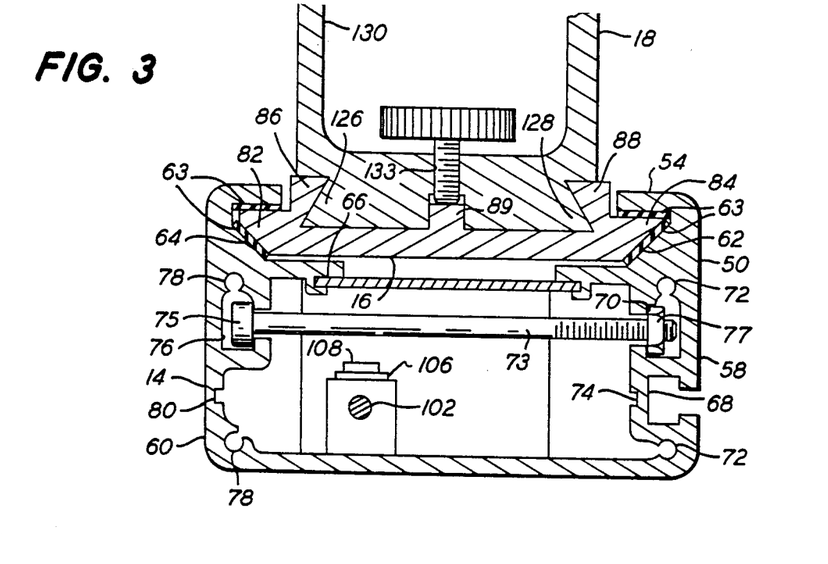
FIG. 3 is a sectional view taken along line 3—3 of FIG. 2.

Column 14, as best shown in FIGS. 2 and 3, is hollow and includes top 50, bottom 52, front 54, rear 56 and sides 58 and 60. Front 54 includes a pair of dovetail slides 62, 64 and may include a slot 66 for receiving a cover plate 67, as best seen in FIG. 3. Low friction pads 63 are affixed to dovetail slides 62, 64. Side 58 includes a first T-slot 68, a second T-slot 70 and a pair of screw bosses 72, one of which is integral with T-slot 70. Side 58 further includes a notch 74 which is in close juxtaposition to T-slot 68. Side 60 includes a T-slot 76 and a pair of screw bosses 78, one of which is integral with T-slot 76. A bolt 73 is positioned in column 14 to straddle T-slots 70 and 76 as best seen in FIG. 3. The round head 75 of bolt 73 is fixed in T-slot 76 and nut 77 which is threaded to the opposite end of the bolt is fixed in T-slot 70. Side 60 further includes a notch 80 which is in alignment with and opposite notch 74 in side 58. It will be appreciated from the drawings that the area of the side walls adjacent the notches 74 and 80 are relatively thin the importance of which will be further detailed hereinafter.

Figure 4:
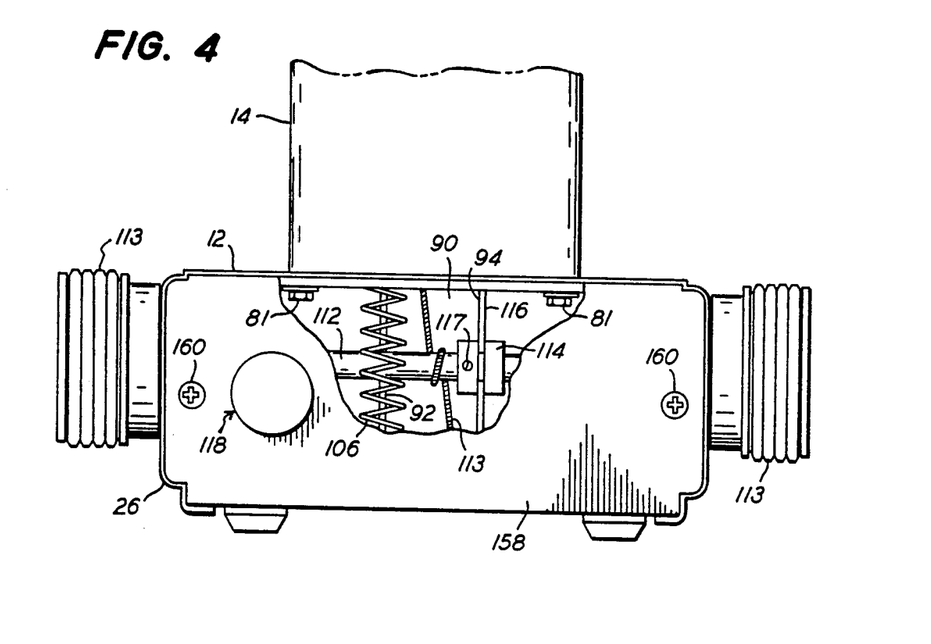
FIG. 4 is a partially broken away rear view of the support column and base, and showing the focus adjusting mechanism in the base.

Column 14 is fixed to base 12, as shown in FIG. 4, by way of self-tapping screws 81 which are secured through the previously described base screw holes and into screw bosses 72 and 78. A cap 83 is fixed to screw bosses 72 and 78 by way of self tapping or thread forming screws 85, one of which is shown in FIG. 2.

Slide 16 includes a first pair of dovetail slides 82 and 84 which are complimentary to, respectively, the dovetail slides 62, 64 formed in column 14. Slide 16 further includes a second pair of dovetail slides 86, 88 adjacent the first pair and a rib 89. As best illustrated in FIG. 2, a guide bracket 90 has a pair of flanges 92, 94 and a trio of retainer posts 96, 97 and 98. The bracket is fixed by, for instance, screws 100 to slide 16.

A counter-balance adjusting screw 102 is fitted through aperture 104 in column cap 83 and threadably received by a wide L-shaped spring bracket 106, as best illustrated in FIG. 2. An elongated coil spring 107 has one end fitted over the end of screw 102 and fixed to a tab 108 formed on one leg 109 of slide bracket 107. The other leg 110 of bracket 107 is slidably engaged to rear 56 of column 14. The opposite end of spring 106 is fixed to retainer post 96 of guide bracket 90.

Figure 5:
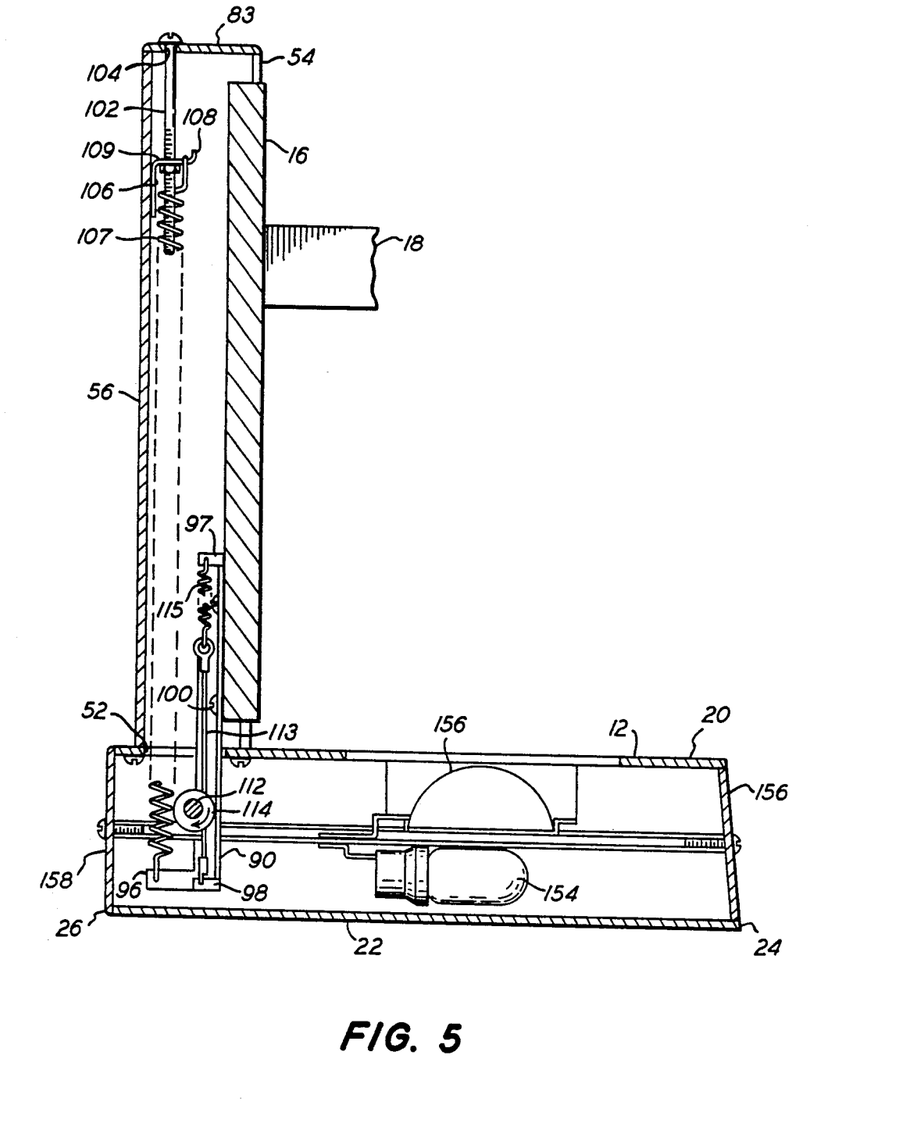
FIG. 5 is a partial sectional view taken along line 5—5 of FIG. 1.

A focus adjusting mechanism 111 is rotatably supported by column 14 at the lower end thereof. Mechanism 111 includes a shaft 112 and a pair of adjusting knobs 113. A guide roller 114 having an annular groove 116 is adjustably mounted by way of screw 117 to shaft 112. As best seen in FIG. 2, roller 114 is mounted to focus shaft 112 such that annular groove 116 receives flange 94 of slide bracket 90. A cable 113 is wrapped one complete turn around focus shaft 112 as illustrated in FIGS. 2, 4 and 5 and has one end fixed to retainer post 94 of bracket 90. Its opposite end is fixed to coil spring 115 which is secured to retainer post 98.

Figure 6:
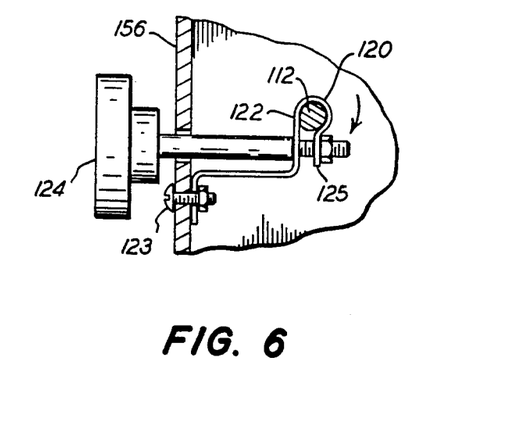
FIG. 6 is a partial sectional view showing the drag adjusting mechanism.

A drag adjusting mechanism 118, as best illustrated in FIGS. 2 and 6, includes a P-shaped clamp member 120, the eye of which is fitted over the focus shaft 112. One leg 122 of member 120 is fixed to, for instance, rear 56 of column 14 by screw 123. An adjusting knob and shaft mechanism 124 is rotatably fixed through the rear 56 of column 14 and threadably received by leg 125 of clamp member 120.

Support bracket 18, as best seen in FIGS. 1 and 3 includes a pair of dovetail slides 126, 128 which are mounted to, respectively, dovetail slides 86, 88 of slide 16. Bracket 18 further includes a first aperture 130 adjacent dovetail slides 126, 128 and a second aperture 132 adjacent the first. As best illustrated in FIG. 3, threaded hole 133 is formed in bracket 18 perpendicular to aperture 130 and has a locking screw 134 threaded thereto which bears against rib 89 of slide 16. A second locking screw 136, similar to screw 134, is threadably received in hole 138 of second aperture 132.

The operation of the microscope will now be described. After the determination has been made as to what type of specimen will be examined, a pod 142, as illustrated in FIG. 1, carrying the appropriate optics is nested in aperture 132 of bracket 18 and secured thereto by locking screw 136. Should the specimen being viewed be, for instance, rather large, it may be necessary to raise the optics pod 142 beyond the extent of adjustment travel normally available by focus adjusting mechanism 111. This task is easily accomplished by loosening locking screw 134 until it no longer contacts rib 89 of slide 16. Dovetail slides 126, 128 are thereby released from locking engagement with, respectively, dovetail slides 86, 88 of column 14. The support bracket 18 may be then manually moved up slide 16 to a more desirable location. Locking screw 134 is then retightened to secure bracket 18 and optics pod 142 in place.

To gain focus, shaft 112 is rotated in the appropriate direction which, in turn, takes up (shortens) a certain amount of cable 113 on one side of the shaft 112 while paying out (lengthens) an exactly similar amount of cable on the other side. It will be seen that the slide 16, which is secured to cable 113 through bracket 90, will be moved vertically an amount which exactly corresponds to the amount of cable 113 taken up or paid out. Coil spring 115 provides a tensioning force to cable 113 thereby assuring that it remains taut no matter which direction shaft 112 is rotated.

The annular groove 116 of guide roller 114 is in, as previously described, positive rolling contact with flange 94 of bracket 90. Thus, as the focus shaft is rotated, torque is transmitted from the guide roller 114 to the bracket 90 which assists cable 113 in translating slide 16 from one position to another. Additionally, the suspended weight of the optics pod 142 and associated support bracket 18 will cause the slide 16 to pivot about an axis toward the upper end of the column. In turn, the slide 16 acts as a lever arm exerting more force against the guide roller 114. As the weight of the support bracket 18 and pod 142 increases, so too does the force exerted against the guide roller 114 and the assist provided in translating the slide 16 from one position to another. It will also be understood that annular groove 116, guides slide 16 during translation thereby assisting in preventing side motion.

As previously described hereinabove, cable 113 is wrapped once about focus shaft 112 and guide roller 114 is in rolling point contact with bracket flange 94. Therefore, while there is sufficient friction between cable 113 and shaft 112 to provide rotational drive, should the operator try to drive the slide 16 beyond its limits of up or down excursions, or should a resistance be encountered by, for instance, the optics pod 142 striking the specimen, the friction exerted by cable 113 on shaft 112 will be overcome and it will slip on shaft 112. Additionally, guide roller 114 will similarly slip on flange 94. An inexpensive, yet quite precise, slip clutch mechanism is therefore provided.

Additionally, should the slide member 16 appear to be too loose in the column 14, an easy and quick adjustment may be accomplished by way of access to bolt 73. It will be seen in FIG. 3 that the nut 77 is captured in T-slot 70 and is prevented from rotating. As previously described, bolt head 75 is round and may rotate in slot 76. Thus, rotation of the bolt in the appropriate direction tends to pivot sides 58 and 60 toward or away from each other about, respectively, notches 74 and 80. For instance, should it be desirable to decrease the amount of play in the slide 16, bolt 73 is tightened which, in turn, pivots sides 58 and 60 toward each other. The areas of column 14 adjacent notches 74 and 80 offer the least resistance against tightening of bolt 73 and, accordingly, the sides 58, 60, respectively, will pivot toward the dovetail slides. By loosening bolt 73, the force exerted against sides 58 and 60 is reduced and the amount of play or side motion, evident in slide 16 is proportionately increased.

In order to compensate for the change in weight caused by the interchangeable optics feature offered by this device, the previously described counter-balance adjusting screw 102 has been incorporated which, by simple manipulation, may be adjusted to balance the system. If a heavy optics pod is being utilized, the counter-balance screw 102 would be adjusted clockwise, as seen in FIG. 2. As mentioned hereinabove, leg 110 of the L-shaped spring bracket 106 is slidably engaged to column 14 and, therefore, the bracket is prevented from rotating. Consequently, bracket 106 is drawn upward toward column cap 83 stretching coil spring 107. The amount of force applied by spring 107 to the retaining post 96 is thereby increased which likewise increases the amount of force applied against slide 16. Easy and exact balancing of the system may be readily accomplished.

It has been found that the above-described counter-balancing system functions so well that, in many instances, essentially no torque is needed to rotate focus shaft 112. While this may seem to be a desirable situation, it may prove to be onerous as the focusing system may become too sensitive. Therefore, the previously described drag adjusting mechanism 118 has been provided. By referring to FIG. 6 it will be evident that by tightening adjusting screw 124, the free leg 125 is drawn toward fixed leg 124 which effectively increases the clamping force exerted against focus shaft 112. Additionally, by viewing the specific shape of the clamp member 120 and the manner in which it is affixed to column 14, it will be seen that as the focus shaft 112 is rotated clockwise as seen in FIG. 6, the clamp member 120 tends to wrap itself tighter about the shaft 112. The more thin and flexible the clamp member 120 is, the more effective is the clamping force it exerts on focus shaft 112. The difference in rotational drag offered by the drag adjusting mechanism 118 when rotating shaft 112 in one direction as compared to the other direction helps to overcome the effects of gravity. The operator perceives a more equal resistance whether driving the load up or down.

Having fully described the operation of the above-referenced microscope, the following will set forth additional benefits to be had by utilizing the concepts disclosed herein.

It will be recalled from the previous description that, in the past, microscopes were designed to perform one type of work and, as such, they did not readily lend themselves to performing other tasks. Accordingly, costs for both the manufacturer and consumer were quite high. By utilizing the modular system envisioned herein, the costs of such instruments will be substantially reduced and the potential applications increased. However, there will be no reduction in quality, performance or dependability.

As is well known, extrusions are made by forcing a mass, such as aluminum, through a die on which a predetermined shape has been formed. As a result, the mass is transformed to exactly conform to the shape of the die. The cost of the die itself is quite inexpensive, as is the cost of the raw material.

Accordingly, the shapes of the extruded base 12, column 14, slide 16 and support bracket 18 have been carefully selected to offer the most utility and adaptability for the greatest range of microscopes being considered. The length of each extruded part may be custom tailored by merely cutting the extrusion to the desired length. As such, the same basic extrusion can be made to serve several functions by merely providing the part in different lengths. Further, by stocking a relatively inexpensive series of options, each microscope constructed from the above-described extrusions can be customized with no additional expense to perform several separate and distinct functions. As an example, should a base wider than the provided extruded base be required, a pair of optional stage extenders 150, as seen in FIG. 1, could be fitted to interlocking slots 38 and 42. The width of the stage can be effectively made to any size the user's desires. Also, any number of accessories, such as is shown by illuminator 152 in FIG. 1, may be adapted and locked in any position to T-slot 68 of column 14. No added cost, stand alone devices need be stocked. Still further, should built-in illumination be required, an appropriate lamp 154, best shown in FIG. 5, could be taken off the shelf and slipped into place in, for instance, the extruded screw bosses 36 and 40 of base 12. A complimentary condenser 156 may be supported in screw bosses 36 and 40 or each of these devices may be supported in the accessory mounting slot 34. Front 156 and rear 158 panels may be easily put on or removed by way of self-tapping screws 160, as shown in FIG. 4, which are received in screw bosses 36 and 40.

Figure 8:
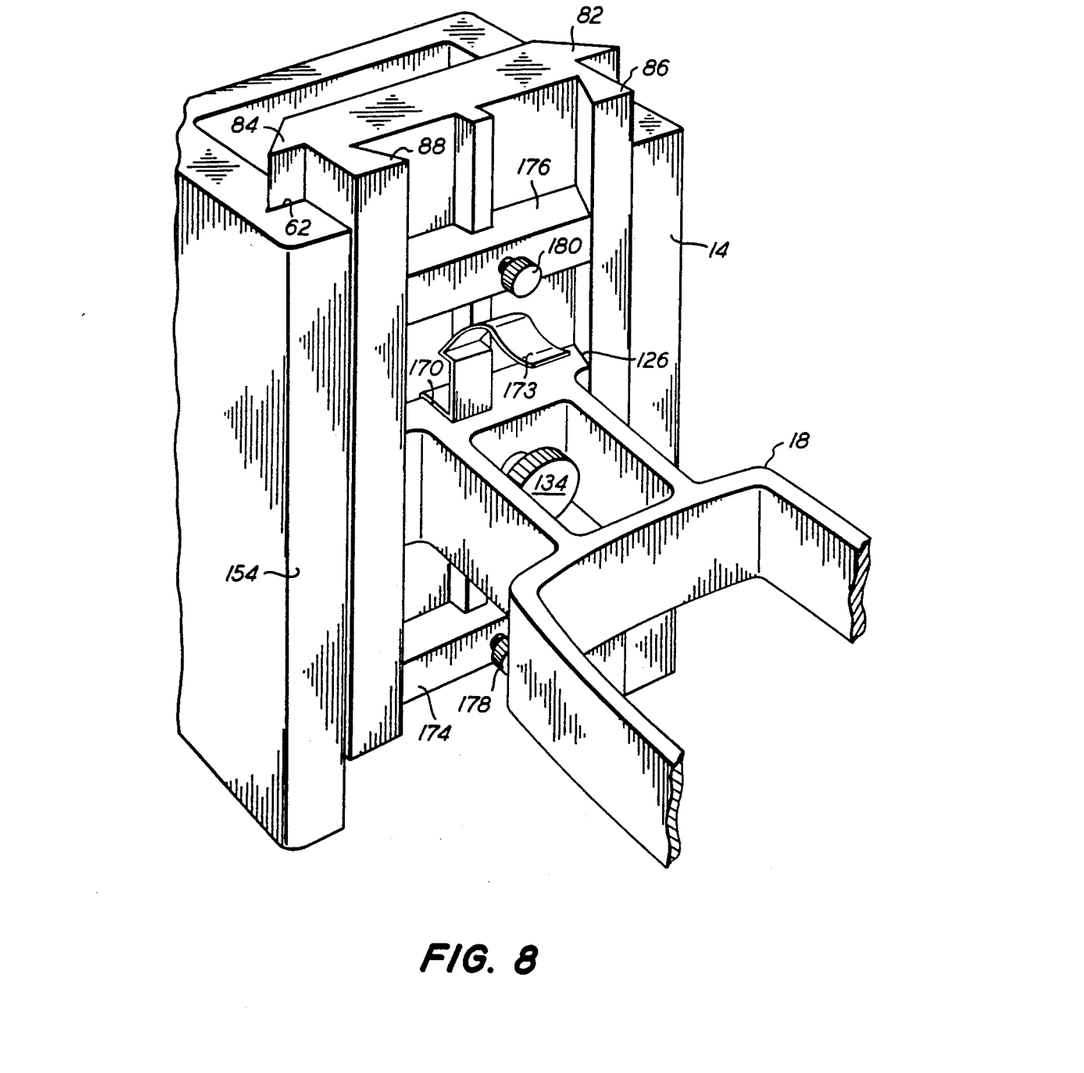
FIGS. 8 and 9 are partial perspective views of a further embodiment of the invention.
Figure 9:
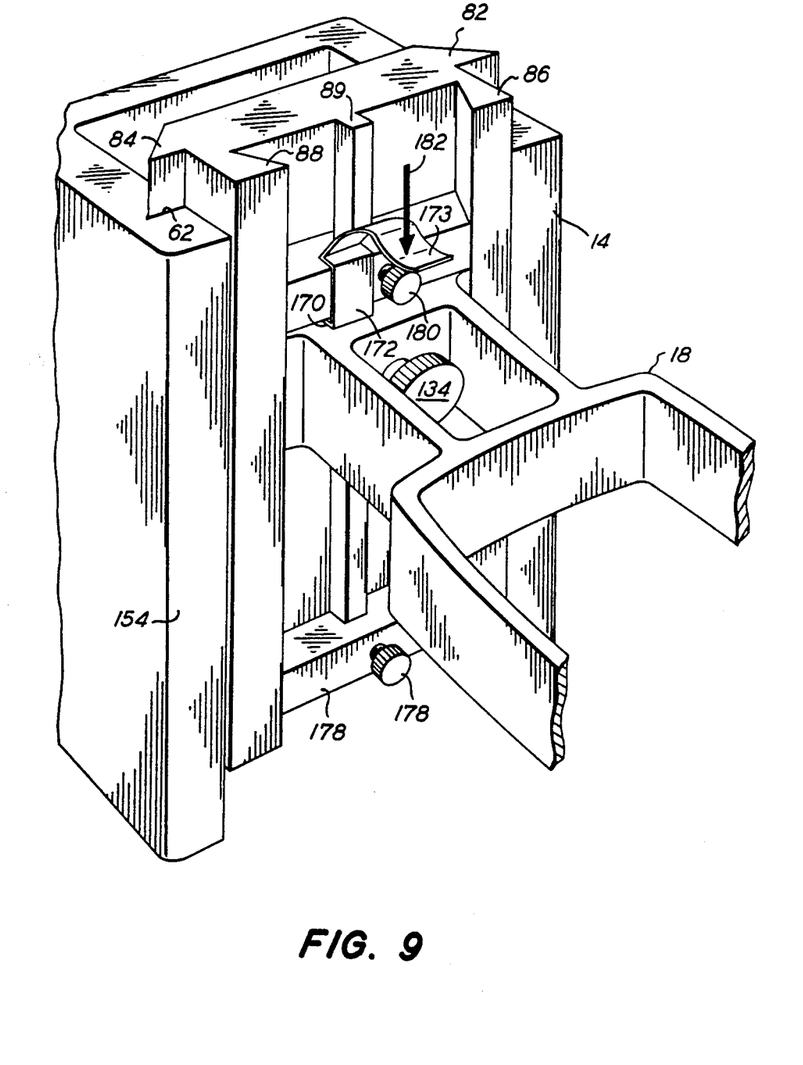

In the instance where it is desirable to examine both the flat surface and the edge of a large object, such as a printed circuit board, it would be expeditious to rapidly and accurately change the position of the viewing optics 142 from a low position on the column to a high position. It will be seen from FIGS. 8 and 9 that the modular construction of the instant invention readily permits such changes. The previously described support bracket 18 would have a vertical slot 170 extruded therein to which a latch spring 172 is secured by any appropriate means, not shown. As seen in FIGS. 8 and 9, slot 170 is offset from the centerline of the support bracket 18 and, therefore, the slide 16 to which it is mounted. A lower limit stop bracket 174 is appropriately fitted to slide dovetails 82, 84 and positioned below the support bracket 18 toward the lower end of column 14. An upper limit stop bracket 176 is similarly fitted to the slide dovetails above the support bracket 18.

When the optimum focus position has been determined for examining the flat surface of the above-referenced printed circuit board, the lower limit stop bracket 174 would be butted against the lower surface of support bracket 18 and fixed to slide 16 by way of lock screw 178. In order to examine the edge of the printed circuit board, the support bracket 18 carrying the optics pod 142 would be raised on slide 16 to the appropriate focus position and locked in place by adjusting screw 134. Upper limit support bracket 176 is then butted against the lower surface of bracket 18 and locked in place by screw 180.

When support bracket 18 is raised, latch spring 172 is designed to deflect outwardly as it initially engages the bottom surface of upper limit stop bracket 176 and to snap in place on the top surface thereof when the support bracket 18 engages the upper limit stop bracket 176. It will be appreciated from FIG. 9 that the latch spring 172 firmly holds the support bracket 18 in the desired upper examination position without having to lock screw 134 against slide 16.

In order to return the lower examining position, it is only necessary to push downward on extension 173, as indicated by arrow 182 in FIG. 9, which deflects the spring outwardly away from upper limit stop bracket 176 thereby releasing it to return to engagement against lower limit stop bracket 174. The microscopic examination of two separate and distinct surfaces of an object may be, therefore, readily accomplished time after time.

Additionally, should a change of support brackets 18 be desired it is only necessary to loosen thumbscrew 134 which in turn loosens dovetail slides 126, 128 from locking engagement with, respectively, dovetail slides 86, 88 and bracket 18 easily removed. A completely different type of support bracket may then be slid into place.

Additionally, although the focus adjusting mechanism 110 has been described as being supported in the column 14 there may be many instances wherein it would be desirable to incorporate this mechanism into the base 12 such as is shown in FIGS. 3 and 5. It will be apparent that, because of the complete modularity offered by extruded parts, the base only needs to have an access aperture machined in its top surface 20 through which the bracket 90, balance spring 106 and cable 113 could pass.

From the foregoing, it can be seen that the present invention provides a modular microscope which is economically and accurately constructed from extruded parts. As such any number of different microscopes may be assembled by either the manufacturer or the end user by utilizing parts readily available off the shelf. The present invention, accordingly, reduces the complexity of the instrument as well as the cost. Further, this invention expands the usefulness of the instrument by permitting multi-use applications.

Having described by invention, however, many modifications to it will become readily apparent to those having skill in the art without deviating from the spirit of the invention as defined by the scope of the appended claims.

We claim:

1. Modular apparatus for supporting a microscope, comprising:
    an extruded column having included therein; (a) longitudinally extruded bearing ways for receiving and guiding a linearly moveable slide member having a microscope supported thereon, (b) a plurality of extruded fastener receiving apertures, and (c) means for removing play from the linearly moveable slide member including a pair of slots extruded in said column on opposite sides thereof, said slots having means disposed therein for pivoting said opposed sides about said slots toward or away from each other to thereby adjust said linearly moveable slide member.

2. The apparatus as set forth in claim 1 wherein said means disposed in said slots comprises a bolt and nut, threadably affixed thereto, said bolt being rotatably supported in one of said slot and said nut being secured to prevent rotation thereof in said other slot, whereby rotation of said bolt provides the pivoting force to said sides.

3. The apparatus as set forth in claim 2 and further including means extruded therein adjacent said pair of slots for facilitating pivoting of said sides.

4. The apparatus as set forth in claim 1 and further including means extruded in at least one of said sides for receiving and holding an accessory in a preselected position along said extruded column.

5. Modular apparatus for supporting a microscope, comprising:
    (1) an extruded column having defined therein;
        (a) longitudinally extruded bearing ways, (b) a plurality of extruded fastener receiving apertures, (c) a pair of longitudinally extruded slots;

(2) an extruded slide member including means extruded longitudinally thereon to which a microscope support member is fixed having a first pair of bearing ways extruded thereon, said slide member being mounted thereby to said column bearing ways, said slide member further including a second pair of bearing ways adjacent said first pair of bearing ways and said microscope support member is adjustably mounted to said second pair of slide bearing ways for movement therealong by way of complimenting bearing ways formed thereon; and (3) means adapted to said second pair of slide bearing ways to limit the adjustment travel of said microscope support member.

6. The apparatus as set forth in claim 1 wherein said means for limiting adjustment comprises a pair of stop members affixed to said second pair of slide bearing ways, one of said stop members being positioned above said microscope support member and the other below.

7. The apparatus as set forth in claim 6 wherein said pair of stop members are adjustably mounted to said second pair of slide bearing ways.

8. The apparatus as set forth in claim 7 wherein said microscope support member includes means thereon for locking said support member to said stop member positioned above said support member.

9. The apparatus as set forth in claim 8 wherein said locking means comprises a resilient member affixed to said support member, said resilient member automatically deflecting away when contact with the bottom surface of said upper stop member is made and automatically locking in place on the top surface of said upper stop member.

10. The apparatus as set forth in claim 5 and further including low friction pads interposed between the bearing ways of said column and said extruded slide member.

11. The apparatus as set forth in claim 5 and further including a focus adjusting mechanism rotatably mounted to said column, said mechanism being coupled to said slide member to provide movement thereof longitudinally in said column bearing ways.

12. The apparatus as set forth in claim 11 wherein said focus adjusting mechanism comprises a shaft rotatably mounted to said column and a cable wrapped at least one turn about said rotatable shaft the opposite ends of which are fixed to said slide member above and below said rotatable shaft.

13. The apparatus as set forth in claim 12 wherein said cable is resiliently mounted to said slide member.

14. The apparatus as set forth in claim 12 wherein the opposite ends of said cable are coupled to a guide bracket which is affixed to said slide member, said guide bracket including means thereon for engagement with said rotatable shaft as said slide member is moved longitudinally in said column.

15. The apparatus as set forth in claim 14 wherein said means for engagement with said rotatable shaft comprises a flange the edge of which contacts the periphery of said rotatable shaft.

16. The apparatus as set forth in claim 15 wherein said rotatable shaft includes means thereon for receiving and guiding said guide bracket flange.

17. The apparatus as set forth in claim 16 wherein said receiving and guiding means comprises a guide roller having an annular channel formed therein in which said flange is received.

18. The apparatus as set forth in claim 12 and further including torque adjusting means coupled to said rotatable shaft for selectively setting the amount of drag on said rotatable shaft.

19. The apparatus as set forth in claim 18 wherein said torque adjusting means comprises a clamping collar adjustably mounted about said rotatable shaft and fixed to said column.

20. The apparatus as set forth in claim 19 wherein said clamping collar is adjustably mounted to said rotatable shaft by an adjusting knob and shaft assembly which is threadably received by said clamping collar to thereby vary the clamping force exerted on said rotatable shaft.

21. The apparatus as set forth in claim 11 and further including means for counter-balancing the weight of said slide member and microscope mounted thereto.

22. The apparatus as set forth in claim 21 wherein said counter-balancing means comprises a resilient member having one of its ends fixed to said slide member and its other end fixed to a bracket which is adjustably coupled to said column for linear movement therealong, whereby longitudinal adjustment of said adjustable bracket on said column alters the force exerted by said resilient member on said slide member thereby compensating for the weight of said slide member and microscope mounted thereto.

23. The apparatus as set forth in claim 11 wherein said plurality of fastener receiving apertures are extruded in said column between the top and the bottom thereof and wherein a base is affixed to the bottom by way of self-threading fasteners secured to said fastener receiving apertures.

24. The apparatus as set forth in claim 23 wherein said adjusting mechanism is mounted to said base.

25. The apparatus as set forth in claim 23 wherein said base includes track means extruded thereon for receiving and holding at least one member substantially parallel to the surface of the base to which said column is mounted.

26. The apparatus as set forth in claim 23 wherein said base further includes means extruded therein for receiving and supporting any of a number of accessories appropriate for use with a microscope.

27. Apparatus for supporting and linearly moving the viewing optics of an optical instrument, comprising:

(a) a base member;

(b) an extruded column including:
   (1) first means extruded therein for attachment of said base and said base being attached thereto, and
   (2) second means extruded therein for receiving and guiding an extruded slide member;

(c) an extruded slide member mounted for vertical linear movement in said extruded receiving and guiding means, said slide member including:
   (1) means for mounting opposite ends of a drive cable thereon, and
   (2) means for selectively attaching appropriate viewing optics;

(d) an adjusting shaft rotatably mounted to said extruded column; and (e) a drive cable wrapped at least one turn about said adjusting shaft and having its opposite ends resiliently mounted between said slide member mounting means, whereby rotation of said adjusting shaft causes said drive cable to move said slide member linearly in said column receiving and guiding means.

28. A supporting and guiding apparatus for precisely vertically translating a microscope from a first position to a second, comprising:

an extruded support column having a pair of bearing ways extruded thereon for receiving and guiding therealong a slide member to which a microscope is mounted, said column further including a pair of extruded slots for receiving therein a play adjusting means;

an extruded slide member, said slide member being mounted to said column bearing ways by way of a complimentary pair of bearing ways which are extruded thereon;

means for adjusting play being disposed in said slots for selectively adjusting the amount of play between said slide and said column; and a focus adjusting mechanism rotatably mounted to said column and coupled to said slide member to enable movement of said slide member along said column upon rotation of said adjusting mechanism.

29. The method of manufacturing a modular support and focus adjusting mechanism for a microscope, comprising the steps of:

(a) extruding a column having defined therein a pair of bearing ways, a plurality of fastener receiving apertures and a pair of opposed slots;

(b) providing a support aperture through said column substantially perpendicular to said bearing ways, fastener receiving apertures and slots extruded therein;

(c) extruding a slide member having defined thereon a pair of bearing ways complimentary to said column bearing ways;

(d) mounting said slide member to said column via said complimenting bearing ways;

(e) mounting a focus adjusting shaft assembly through said column support aperture;

(f) coupling said slide member and said focus assembly together via a cable the cable wrapping once around said shaft assembly and having its opposite ends mounted to said slide member;

(g) mounting a means to said pair of opposed slots extruded in said column for varying the amount of play between said column and said slide member; and (h) mounting a base and a cap to said column by way of self-threading fasteners which are received in said extruded fastener receiving apertures.

* * * * *